(12) United States Patent
Fortkort

(10) Patent No.: US 10,902,034 B2
(45) Date of Patent: *Jan. 26, 2021

(54) METHOD FOR POPULATING A MAP WITH A PLURALITY OF AVATARS THROUGH THE USE OF A MOBILE TECHNOLOGY PLATFORM

(71) Applicant: John A. Fortkort, Austin, TX (US)

(72) Inventor: John A. Fortkort, Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/000,201

(22) Filed: Jun. 5, 2018

(65) Prior Publication Data

US 2019/0042597 A1 Feb. 7, 2019

Related U.S. Application Data

(63) Continuation of application No. 14/174,838, filed on Feb. 6, 2014, now Pat. No. 9,990,373.

(Continued)

(51) Int. Cl.
*G06K 9/00* (2006.01)
*G06F 16/29* (2019.01)
(Continued)

(52) U.S. Cl.
CPC .............. *G06F 16/29* (2019.01); *A63F 13/10* (2013.01); *A63F 13/50* (2014.09); *A63F 13/58* (2014.09);
(Continued)

(58) Field of Classification Search
CPC .......... G06K 9/00221; G06K 9/00228; G06K 9/00248; G06K 9/00268; G06K 9/00281
See application file for complete search history.

(56) References Cited

U.S. PATENT DOCUMENTS 7,203,367 B2 * 4/2007 Shniberg ............ G06K 9/00221
382/224
8,694,899 B2 * 4/2014 Goossens ............... G06Q 50/01
715/763

(Continued)

FOREIGN PATENT DOCUMENTS

WO    WO-2012005499 A2 * 1/2012 ........... G06T 11/001

OTHER PUBLICATIONS

Automatic Generation of Personalized human Avatars from Multi-view Video, Naveed Ahmed et al., ACM, 1-59593-098-1, 2005, pp. 257-260 (Year: 2005).*

*Primary Examiner* — Jayesh A Patel
(74) *Attorney, Agent, or Firm* — John A. Fortkort; Fortkort & Houston PC

(57) ABSTRACT

A method is provided for populating a map with a set of avatars through the use of a mobile technology platform associated with a user. The method (201) includes developing a set of facial characteristics (205), wherein each facial characteristic in the set is associated with one of a plurality of individuals that the user has encountered over a period of time while using the mobile technology platform; recording the locations (207) and times at which each of the plurality of individuals was encountered; forming a first database by associating the recorded times and locations at which each of the plurality of individuals was encountered with the individual's facial characteristics in the set; generating a set of avatars (309) from the set of facial characteristics; and using the first database to populate (319) a map (307) with the set of avatars.

20 Claims, 2 Drawing Sheets

US 10,902,034 B2

Page 2

Related U.S. Application Data

(60) Provisional application No. 61/761,512, filed on Feb. 6, 2013.

(51) Int. Cl.
*A63F 13/40* (2014.01)
*A63F 13/58* (2014.01)
*A63F 13/50* (2014.01)

(52) U.S. Cl.
CPC ..... *G06K 9/00221* (2013.01); *G06K 9/00228* (2013.01); *G06K 9/00248* (2013.01); *G06K 9/00268* (2013.01); *G06K 9/00281* (2013.01); *A63F 2300/5533* (2013.01); *A63F 2300/5553* (2013.01); *A63F 2300/69* (2013.01)

(56) References Cited

U.S. PATENT DOCUMENTS

| | | | | |
|---|---|---|---|---|
| 9,177,410 | B2* | 11/2015 | Mandel | G06N 5/02 |
| 9,251,616 | B2* | 2/2016 | Shuster | G06T 13/40 |
| 9,412,192 | B2* | 8/2016 | Mandel | G06N 5/04 |
| 9,652,134 | B2* | 5/2017 | Goossens | G06Q 50/01 |
| 9,990,373 | B2* | 6/2018 | Fortkort | G06K 9/00281 |
| 10,102,661 | B2* | 10/2018 | Shuster | G06T 17/00 |
| 2003/0126121 | A1* | 7/2003 | Khan | G06K 9/00 |
| 2004/0117067 | A1* | 6/2004 | Jouppi | G06F 3/011 |
| | | | | 700/259 |
| 2006/0143569 | A1* | 6/2006 | Kinsella | G06Q 10/107 |
| | | | | 715/752 |
| 2008/0013706 | A1* | 1/2008 | Kelley | H04M 3/565 |
| | | | | 379/202.01 |
| 2008/0243861 | A1* | 10/2008 | Wassingbo | G06F 16/434 |
| 2008/0254840 | A1* | 10/2008 | Kano | H04N 7/147 |
| | | | | 455/566 |
| 2009/0055484 | A1* | 2/2009 | Vuong | G06Q 10/107 |
| | | | | 709/206 |
| 2009/0113314 | A1* | 4/2009 | Dawson | G06F 3/011 |
| | | | | 715/757 |
| 2009/0128567 | A1* | 5/2009 | Shuster | G06T 13/40 |
| | | | | 345/473 |
| 2009/0183071 | A1* | 7/2009 | Smith | G06F 3/04847 |
| | | | | 715/706 |
| 2009/0300513 | A1* | 12/2009 | Nims | A63F 13/58 |
| | | | | 715/747 |
| 2010/0091105 | A1* | 4/2010 | Watanabe | H04N 5/232127 |
| | | | | 348/140 |
| 2010/0100851 | A1* | 4/2010 | Clark | G06T 19/00 |
| | | | | 715/849 |
| 2010/0287510 | A1* | 11/2010 | Cragun | G09B 21/00 |
| | | | | 715/848 |
| 2011/0296324 | A1* | 12/2011 | Goossens | G06F 3/04883 |
| | | | | 715/763 |
| 2012/0121764 | A1* | 5/2012 | Lai | B65D 85/8043 |
| | | | | 426/77 |
| 2012/0321140 | A1* | 12/2012 | Xiong | G06K 9/00228 |
| | | | | 382/108 |
| 2012/0329561 | A1* | 12/2012 | Evans | A63F 13/79 |
| | | | | 463/43 |

* cited by examiner

METHOD FOR POPULATING A MAP WITH A PLURALITY OF AVATARS THROUGH THE USE OF A MOBILE TECHNOLOGY PLATFORM

CROSS-REFERENCE TO RELATED APPLICATION

This application is a continuation of U.S. Ser. No. 14/174,838, entitled "CREATION AND GEOSPATIAL PLACEMENT OF AVATARS BASED ON REAL-WORLD INTERACTIONS", having the same inventor, which was filed on Feb. 2, 2014, and which is incorporated herein by reference in its entirety, which claims the benefit of U.S. provisional application No. 61/761,512, filed Feb. 6, 2013, having the same title and the same inventor, and which is incorporated herein by reference in its entirety.

FIELD OF THE DISCLOSURE

The present disclosure relates generally to systems and methods for creating avatars, and more particularly to methods for populating a map with avatars through the use of a mobile technology platform.

BACKGROUND OF THE DISCLOSURE

Avatars have come into popular usage in on-line applications such as gaming and social media applications. The use of avatars provides a means by which users or characters may be identified by others in a virtual setting, such as during online gaming or in social media.

Various means for generating avatars are currently known to the art. One popular method involves selecting predefined characters from an existing set of characters, and then selecting features or characteristics, such as clothing, hair color, sex, and accoutrements which, together, define the appearance of the avatar.

More recently, methods for generating avatars have grown more sophisticated. For example, U.S. 2012/0329561 (Blythe et al.) describes systems and methods that enable the generation of avatars or art from a user's own genetic information. Users may obtain their personal genomic information via direct-to-consumer (DTC) genotyping service or a full resequencing service. The user's genomic profile may be processed by a software algorithm that translates the genotypes into model phenotype descriptions based on a set of reconfigurable rules. Derived from the users' own DNA, phenotype descriptions may be used to create avatars that represent the users in online games and social media applications. Such phenotype descriptions can also be used to create games that are customized to the user, and to generate artwork.

U. S. 2009/0300513 (Nims et al.) describes an avatar or avatar environment which is used to visualize data, and which may be provided within a social networking system or service (for example, as part of the Internet) and/or within a desktop widget, panel, gadget, or the like. The avatar may evolve or alter its appearance, animation, or other visual or audio characteristics in response to the data or other input such as athletic activity performed by a corresponding user. In particular, in one embodiment, the avatar may respond to and provide visualization of athletic or sport performance data.

U. S. 2012/0127164 (Rhee et al.) discloses a processing apparatus for creating an avatar. The processing apparatus calculates skeleton sizes of joints of the avatar and local coordinates corresponding to sensors attached to a target user by minimizing a sum of a difference function and a skeleton prior function. This difference function represents a difference between a forward kinematics function regarding the joints with respect to reference poses of the target user and positions of the sensors, and the skeleton prior function based on statistics of skeleton sizes with respect to reference poses of a plurality of users.

WO/2012/005499 (Joo et al.) discloses a method and an apparatus for generating an avatar. In one embodiment, the method for generating the avatar includes the steps of recognizing an object to be formed as an avatar; generating distinguishing feature information by recognizing a distinguishing feature of the object; generating distinguishing feature metadata including the distinguishing feature information; and generating the avatar using the distinguishing feature metadata. The disclosed method and apparatus distinguish the difference between similar avatars by generating the avatar using an intrinsic feature of each object, which is the distinguishing feature when generating the avatars for the similar objects such as twins.

Other methods for generating avatars are also known to the art. For example, a research team led by Ayellet Tal of the Technion-Israel Institute of Technology has developed a method for generating avatars from digital images (see Kevin Hattori, "Making 3D Avatars The Easy Way", Dec. 1, 2010, published at phys org) The method may purportedly be used to create undistorted 3D avatars without regard to the proportions of the targeted model. These avatars may then be used in computer games and/or in Internet forums and other online communities.

SUMMARY OF THE DISCLOSURE

Figure 1:
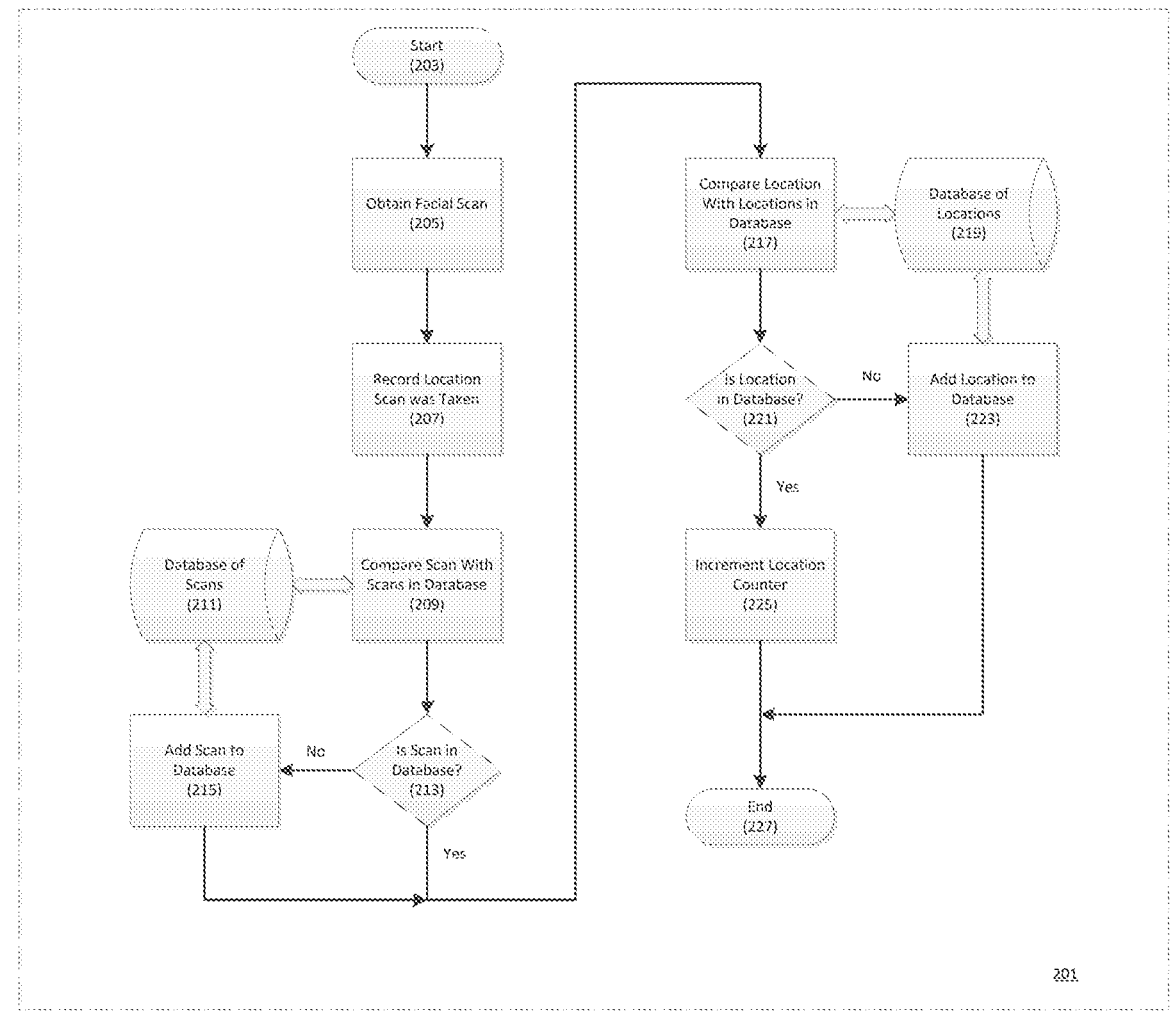
FIG. 1 is a flowchart for an embodiment of a process for acquiring scans in accordance with the teachings herein.

In one aspect, a method is provided for populating a map with a set of avatars through the use of a mobile technology platform associated with a user. The method comprises (a) developing a set of facial characteristics, wherein each facial characteristic in the set is associated with one of a plurality of individuals that the user has encountered over a period of time while using the mobile technology platform; (b) recording the locations (and preferably also the times) at which each of the plurality of individuals was encountered; (c) forming a first database by associating the recorded locations (and preferably, also the recorded times) at which each of the plurality of individuals was encountered with the individual's facial characteristics in the set; (d) generating a set of avatars from the set of facial characteristics; and (e) using the first database to populate a map with the set of avatars.

In another aspect, a method is provided for populating a map with a plurality of avatars through the use of a mobile technology platform. The method comprises (a) using the mobile technology platform to perform facial recognition scans on a plurality of real-world individuals in the environment external to the mobile technology platform, wherein each of the facial recognition scans uses at least one facial recognition algorithm to identify a set of facial features on a subject of the scan; (b) recording the time and location at which each facial recognition scan was performed; (c) associating a set of facial features of one of the plurality of real-world individuals with a set of time and location data, wherein the set of time and location data include at least one time and location at which a facial recognition scan of the one of the plurality of real-world individuals was performed; (d) generating a plurality of avatars, wherein each of the plurality of avatars is generated from a set of facial characteristics corresponding to one of the plurality of real-world individuals; and (e) for each one of the plurality of avatars, using at least one element selected from the time and location data corresponding to the set of facial features used to generate the one of the plurality of avatars to determine at least one appearance characteristic on a map for the one of the plurality of avatars, wherein the at least one appearance characteristic is selected from the group consisting of (i) a location at which the one of the plurality of avatars appears on the map, and (ii) a time at which the one of the plurality of avatars appears on the map.

DETAILED DESCRIPTION

Despite the many advances in the technology for generating avatars, further needs exist in the art for new methods of creating avatars that appeal to users in new and exciting ways. It has now been found that the foregoing problem may be addressed through a method of creating avatars that draws upon a user's environment, and in particular, the individuals that a user interacts with on a daily basis or other period of time. In one embodiment, this method leverages facial recognition software, which may be resident on the user's mobile technology platform or on a remote computer which is in communication with the user's mobile communications device, to identify individuals a user encounters, and to download facial characteristics of the individuals from a database (which may be, for example, associated with a social media website). Alternatively or in conjunction with the foregoing approach, the user's mobile technology platform may obtain facial characteristics by conducting one or more facial scans of one or more individuals that the user encounters. The set of facial characteristics may then be utilized to generate sets of avatars, which may be used to populate a map.

The resulting avatars may be utilized in various social media applications, gaming applications, and other computer or online uses. For example, the derived avatars may be utilized to populate a map with characters in a gaming application. The resulting gaming experience is then enriched by the resemblance these avatars bear to real-life people that the user has encountered.

In a preferred embodiment, the locations at which an individual is encountered who corresponds to a particular facial scan is recorded. The recorded locations, and possibly the times of the encounters and/or the frequency with which the individual was recorded at a given location, may then be used to determine the locations (and possibly the frequency with which the avatar appears at that location) at which a derived avatar may be disposed in a computer or online application such as, for example, a gaming application.

In some embodiments, the foregoing technology may be utilized with existing mapping software to generate virtual counterparts to real-world locations, and to populate those locations with the derived avatars. Moreover, in some embodiments, the facial recognition software, or other software resident on the mobile technology platform, may also be used to scan in other features of the user's environment (such as, for example, buildings, trees, or the interiors of dwellings), which may be used alone to create a virtual map of the user's environment, or which may be utilized in conjunction with existing mapping software to modify or augment an existing map. Alternatively or in conjunction with the foregoing approach, data or details about the user's environment may be obtained from various other sources or databases such as, for example, various mapping or navigational sites, software, applications, or websites.

FIG. 1 illustrates a first particular, non-limiting embodiment of a method for obtaining facial scans in accordance with an embodiment herein. The method 201 depicted therein commences 203 by obtaining a facial scan 205. Such a scan may be obtained in any suitable manner such as, for example, through the use of a scanning or imaging device, or by identifying a subject through facial recognition and downloading one or more images of the subject from a database. Such a database may be resident on the host device or accessed remotely as, for example, via a server.

Preferably, however, the scan is obtained through a combination of software and hardware resident on a mobile technology platform. Even more preferably, the scans are obtained without user interaction. For example, the scans may be obtained by software on a mobile technology platform which randomly or periodically scans the faces or persons proximal to the user over a period of time (e.g., throughout the day). This process may involve one or more facial recognition algorithms to identify nearby faces that can be scanned.

When a scan is taken, the location at which the scan was taken is preferably recorded 207 in a database 211. The scan is then compared 209 to the other scans in the database 211 to determine 213 whether the subject of the scan already exists in the database 211. If not, the scan is added 215 to the database 211. If so, the process passes to the next step.

The location recorded for the scan is then compared 217 with the locations recorded for the subject of that scan in a location database 219. If the recorded location is determined 221 to be a new location for the subject of that scan (e.g., because the location is not in the location database 219 as a location associated with the subject of the scan), then the location is added 223 to the location database 219. Otherwise, a location counter or other variable representing the frequency at which the location was observed for the subject of that scan is incremented 225 (e.g., with a value of 3 representing the fact that the subject of a scan was registered for a particular location 3 times). The process then ends 227.

Figure 2:
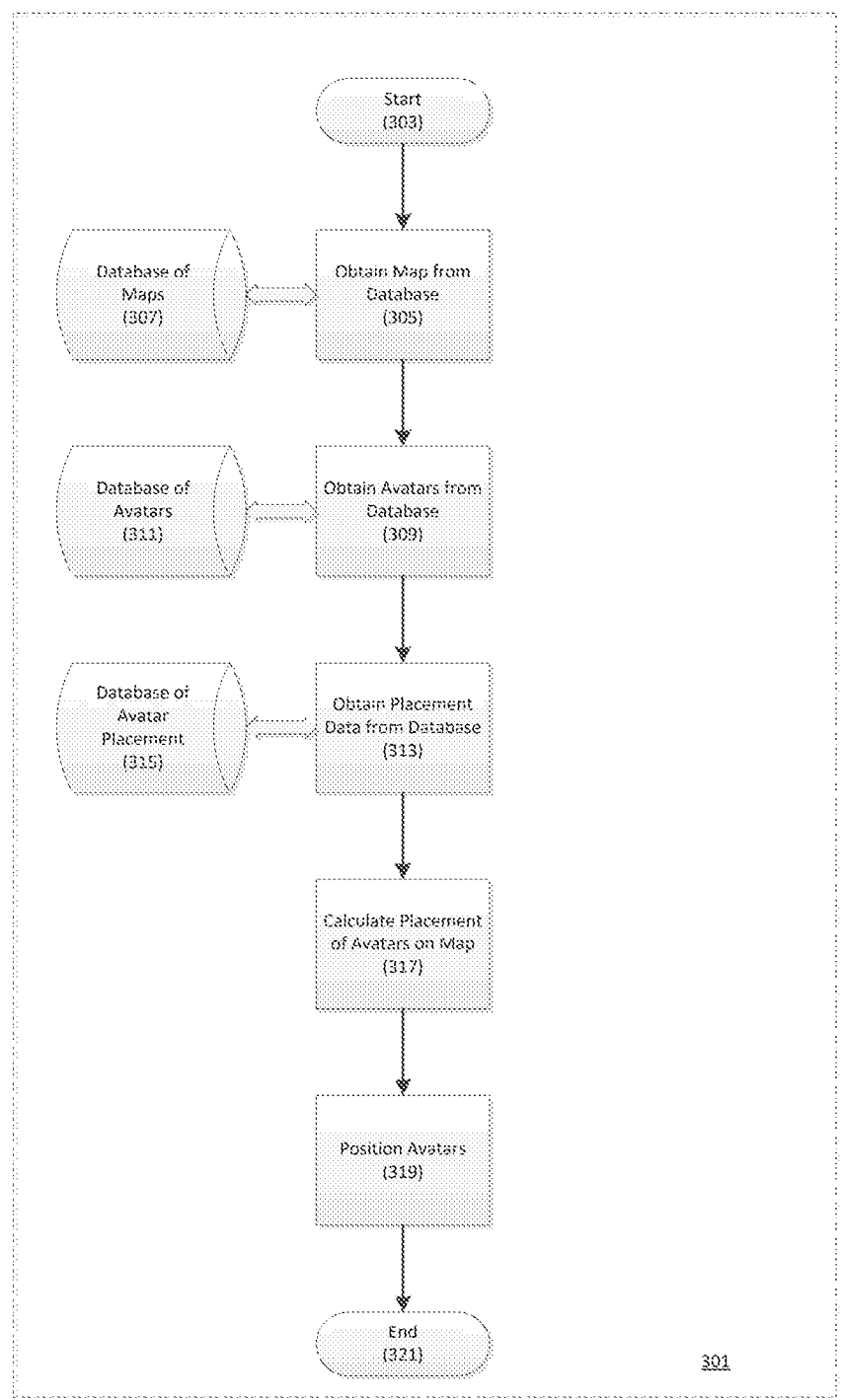
FIG. 2 is a flowchart for an embodiment of a process for the placement of avatars in accordance with the teachings herein.

Turning now to FIG. 2, a particular, non-limiting embodiment of a process 301 is shown for placing avatars on a map. This process may be conducted, for example, as part of an on-line or video game, or as part of rendering a navigational map which is personalized to the user.

The process starts 303 by obtaining a map 305 from a map database 307, and then obtaining avatars 309 from an avatar database 311. The avatar database preferably includes a set of avatars which are generated from the facial scans obtained in the process 201 of FIG. 2. Placement data is then obtained 313 for the avatars from an avatar placement database 315. The placement data is preferably based on the recorded locations at which facial scans corresponding to each avatar were taken or determined to already be in the database of scans 215 (see FIG. 1).

The placement of each avatar on the map is then calculated 317 from the placement data. This may be accomplished in a variety of ways. For example, the placement may be chosen as the location defined by the placement data, or an algorithm may be utilized to introduce a deviation in the placement. Such deviation may be, for example, a random deviation. Such a random deviation may be determined, for example, by the type of location the location data corresponds to.

Moreover, if a facial scan has multiple recorded locations associated with it, the placement of the corresponding avatar may be determined by selecting one of the locations. In some embodiments, this may be conducted by applying a weighting function such that the placement of an avatar in (or proximal to) a particular location on the map occurs at the same or similar frequency as the frequency at which the location for the corresponding facial scan was recorded for the corresponding real-world location.

After the placement of the avatars on the map is calculated 317, the avatars are placed on the map 319 in the calculated locations. The process then ends 321.

Various modifications may be made to the processes described herein. For example, in some embodiments, the facial scans may be obtained in other ways. For example, the facial scans may be performed as part, or subsequent to, an imaging step performed by a mapping company or service such as, for example, the GOOGLE EARTH™ organization, or other organizations which obtain satellite imagery or aerial photography, or which develop geographic information systems (GISs). For example, such facial recognition may be performed by applying facial recognition to the obtained imagery through the use of suitable software.

In other embodiments, placement of the avatars on a map may be determined, in part or in whole, from locations recorded in an address book, from the current locations of mobile technology platforms associated with individuals, or by other means. Placement of the avatars on a map may also be specified by a user.

Various rendering algorithms may be used to generate various types of avatars in the systems and methodologies described herein. In some embodiments, a device associated with a user (which may be, for example, a mobile communications device) may contain avatar rendering software, or may be in communication with a remote server or other device which contains such software. This software may be utilized to generate one or more avatars based on an image obtained by the device, or based on one or more images of an individual in a database which has been detected by the device through facial recognition software or by other suitable means.

In some embodiments, the systems, methodologies and software disclosed herein may be implemented on one or more computational devices. Such computational devices may include one or more hardware central processing units (CPU) that carry out the functions of the device, and may also comprise an operating system configured to perform executable instructions. Such computational devices may also have the ability to connect to, access or interface with a network, a cloud computing infrastructure, an intranet, and/or one or more data storage devices. Preferably, the computational device is connected to the Internet such that it accesses the World Wide Web.

Suitable computational devices that may be utilized to implement the systems, methodologies and software disclosed herein include, but are not limited to, server computers, desktop computers, laptop computers, notebook computers, sub-notebook computers, netbook computers, netpad computers, set-top computers, handheld computers, Internet appliances, mobile smartphones, tablet computers (including those with booklet, slate, and convertible configurations), personal digital assistants, video game consoles, and vehicles. One skilled in the art will appreciate that various smartphones, televisions, video players, and digital music players with optional computer network connectivity may be suitable for use in implementing the systems, methodologies and software disclosed herein.

In some embodiments, the computational device may include an operating system which is configured to perform executable instructions. Such an operating system may comprise, for example, software (including programs and data) which manages the hardware associated with the computational device and which provides services for the execution of applications. Suitable server operating systems which may be utilized for this purpose may include, but are not limited to, FreeBSD, OpenBSD, NetBSD®, Linux, Apple® Mac OS X Server®, Oracle® Solaris®, Windows Server®, and Novell® NetWare®. Suitable personal computer operating systems which may be utilized for this purpose may include, but are not limited to, Microsoft® Windows®, Apple® Mac OS X®, UNIX®, and UNIX-like operating systems such as GNU/Linux®. Suitable operating systems for smart phones and other mobile communications devices which may be utilized for this purpose may include, but are not limited to, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. In some embodiments of the systems and methodologies described herein, the operating system may be provided, in whole or in part, through cloud computing.

In some embodiments of the systems and methodologies described herein, the computational device may include, or have associated with it, one or more storage and/or memory devices. The storage and/or memory devices may consist of one or more physical devices used to store data or programs on a temporary or permanent basis. In some embodiments of the systems and methodologies described herein, one or more of the storage and/or memory devices may have a volatile memory and may require power to maintain information stored therein.

In other embodiments of the systems and methodologies described herein, the storage and/or memory devices may be equipped with non-volatile memory (such as, for example, flash memory) which retains information stored therein when the computational device is not powered. The non-volatile memory may comprise, for example, dynamic random-access memory (DRAM), ferroelectric random access memory (FRAM) or phase-change random access memory (PRAM).

In some embodiments of the systems and methodologies described herein, the computational device may be equipped with, or in communication with, various storage devices such as, for example, CD-ROMs, DVDs, flash memory devices, magnetic disk drives, magnetic tapes drives, optical disk drives, and cloud computing based storage. In further embodiments, the storage and/or memory device may comprise various combinations or sub-combinations of the foregoing devices.

In some embodiments of the systems and methodologies described herein, the computational device may include a display to communicate information visually to a user. The display may be, for example, a cathode ray tube (CRT) display, a liquid crystal display (LCD), a thin film transistor liquid crystal display (TFT-LCD), an organic light emitting diode (OLED) display, a plasma display, a video display, a heads-up display, or the like.

In some embodiments of the systems and methodologies described herein, the computational device may include or be equipped with one or more input devices to receive information from a user. Such input devices may include, for example, various tactile devices, keyboards, pointing devices (such as, for example, mice, trackballs, track pads, joysticks, game controllers, or styluses), touch screens or multi-touch screens, microphones, video cameras, or various combinations or sub-combinations of the foregoing input devices.

In some embodiments of the systems and methodologies described herein, the computational device may include a non-transitory, computer readable, and preferably tangible storage medium or media which is encoded with a program or other operating instructions that are executable by the operating system of the computational device or by another device that the computational device is in communication with. In some embodiments, the computer readable storage medium may be removable from the computational device. The computer readable storage medium may include, but is not limited to, CD-ROMs, DVDs, flash memory devices, solid state memory, magnetic disk drives, magnetic tape drives, optical disk drives, cloud computing systems and services, and the like. The program or other operating instructions may be permanently, substantially permanently, semi-permanently, or non-transitorily encoded on the medium or media.

In some embodiments of the systems and methodologies described herein, the computational device may include one or more computer programs in the form of a sequence of instructions which are executable in the computational device's CPU, and which are written to perform a specified task. These computer readable instructions may be implemented as program modules, such as functions, objects, Application Programming Interfaces (APIs), data structures, and the like, that perform particular tasks or implement particular abstract data types, and may be written in various versions of various languages.

In the systems and methodologies described herein, the functionality of the computer program (or programs) or computer readable instructions may be combined or distributed as desired in various environments. For example, any computer program utilized in the systems and methodologies described herein may comprise one or more sequences of instructions which may be provided from one or more locations, and may include one or more software modules. In some embodiments, such a computer program may include, in part or in whole, one or more components selected from the group consisting of web applications, mobile applications, standalone applications, and web browser plug-ins, extensions, add-ins, and add-ons.

In some embodiments of the systems and methodologies described herein, such a computer program may include a web application which, in various embodiments, may utilize one or more software frameworks and one or more database systems. In some embodiments of the systems and methodologies disclosed herein, the web application may be created upon a software framework such as Microsoft® .NET or Ruby on Rails (RoR), and may utilize one or more database systems such as, for example, relational, non-relational, object oriented, associative, or XML database systems. Relational database systems that may be utilized may include, for example, Microsoft® SQL Server, mySQL™, and Oracle®. Moreover, the web application may be written in one or more versions of one or more languages such as, for example, markup languages, presentation definition languages, client-side scripting languages, server-side coding languages, database query languages, or various combinations or sub-combinations thereof.

In some embodiments of the systems and methodologies described herein, the web application may be written at least partially in (a) a markup language such as Hypertext Markup Language (HTML), Extensible Hypertext Markup Language (XHTML), or eXtensible Markup Language (XML); a presentation definition language such as, for example, Cascading Style Sheets (CSS); a client-side scripting language such as, for example, Asynchronous Javascript and XML (AJAX), Flash® Actionscript, Javascript, or Silverlight®; a server-side coding language such as, for example, Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy; or a database query language such as, for example, Structured Query Language (SQL).

In some embodiments of the systems and methodologies described herein, the web application may integrate enterprise server products such as, for example, IBM® Lotus Domino®. The web application may also include a media player element which may utilize one or more suitable multimedia technologies such as, for example, Adobe® Flash®, HTML 5, Apple® QuickTime®, Microsoft® Silverlight®, Java™, or Unity®.

In some embodiments of the systems and methodologies described herein, a computer program may be utilized which includes a mobile application which is provided to a mobile computational device or mobile technology platform. The mobile application may be provided to the mobile computational device at the time it is manufactured or at a later time by way of download over a suitable network. The mobile application may be created by techniques known to the art using hardware, languages, and development environments which are also known to the art, and may be written in several languages. Suitable programming languages include, for example, C, C++, C #, Objective-C, Java™ Javascript, Pascal, Object Pascal, Python™, Ruby, VB.NET, WML, and XHTML/HTML with or without CSS, and various combinations or sub-combinations thereof.

Several mobile application development environments are known to the art and may be utilized in the development of the mobile application. These include, without limitation, AirplaySDK, alcheMo, Appcelerator®, Celsius, Bedrock, Flash Lite, .NET Compact Framework, Rhomobile, WorkLight Mobile Platform, Lazarus, MobiFlex, MoSync, and Phonegap. Several mobile device manufacturers also currently distribute software developer kits including, for example, iPhone and iPad (iOS) SDK, Android™ SDK, BlackBerry® SDK, BREW SDK, Palm® OS SDK, Symbian SDK, webOS SDK, and Windows® Mobile SDK.

Several commercial forums are available for the distribution of mobile applications. These include, for example, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

In some embodiments, the systems and methodologies described herein may utilize a computer program which includes one or more standalone applications. Such standalone applications may be programs that are run as an independent computer process (that is, not as an add-on to an existing process, e.g., not a plug-in). Such standalone applications are often compiled. A compiler is a computer program(s) that transforms source code written in a programming language into binary object code such as assembly language or machine code. Suitable compiled programming languages include, by way of example, C, C++, Objective-C, COBOL, Delphi, Eiffel, Java™, Lisp, Python™, Visual Basic, and VB .NET. Compilation is often performed, at least in part, to create an executable program.

In some embodiments of the systems and methodologies described herein, the computer program may include one or more executable complied applications.

In some embodiments, the systems and methodologies described herein may include software, server, and/or database modules, or use of the same. Such software modules may be created by techniques known to the art and using machines, software, and languages known to the art, and may be implemented in various ways. These software modules may comprise one or more files, section of codes, programming objects, programming structures, or various combinations or sub-combinations thereof. In some embodiments of the systems and methodologies described herein, the software modules may comprise a web application, a mobile application, and/or a standalone application. The software modules may be present in one or more computer programs or applications, and may be hosted on one or more machines or cloud computing platforms which may be in one or more locations.

In some embodiments, the systems and methodologies described herein may include one or more databases, or use of the same. Such databases may include, for example, relational databases, non-relational databases, object oriented databases, object databases, entity-relationship model databases, associative databases, and XML, databases. These databases may be Internet-based, web-based, cloud computing-based, or may be based on one or more local computer storage devices.

The above description of the present invention is illustrative, and is not intended to be limiting. It will thus be appreciated that various additions, substitutions and modifications may be made to the above describe embodiments without departing from the scope of the present invention. Accordingly, the scope of the present invention should be construed in reference to the appended claims.

What is claimed is:

1. A method for populating a map with a set of avatars through the use of a mobile technology platform associated with a user, comprising:
   capturing a plurality of images of real-world individuals with a mobile technology platform over a period of time;
   developing a set of facial characteristics from the images, wherein each facial characteristic in the set of facial characteristics is associated with one of a plurality of individuals that the user has encountered in person over a period of time while using the mobile technology platform;
   recording, in a first database, locations and times at which each of the plurality of individuals was encountered in person;
   forming a facial characteristics database which associates the recorded times and locations at which each of the plurality of individuals was encountered with that individual's facial characteristics in the set of facial characteristics;
   generating a set of avatars from the set of facial characteristics; and
   using the first database to populate a map with the set of avatars.

2. The method of claim 1, further comprising:
   identifying each of the plurality of individuals;
   wherein identifying the plurality of individuals includes the application of at least one facial recognition algorithm.

3. The method of claim 1, wherein developing a set of facial characteristics from the images includes generating facial scans of the plurality of individuals, and wherein generating facial scans of the plurality of individuals involves the use of an imaging device to capture an image in the real world of one of the plurality of individuals that the user has encountered in the real world.

4. The method of claim 3, wherein generating facial scans of the plurality of individuals involves identifying a real-world subject through facial recognition, and downloading one or more images of the subject from a database.

5. The method of claim 1, wherein recording locations and times at which each of the plurality of individuals was encountered includes recording the real-world location at which a recording of the individual was captured using location awareness features on the mobile technology platform.

6. The method of claim 1, further comprising creating a map, wherein said map is created by scanning in features from the user's environment, and wherein said features are selected from the group consisting of buildings, trees and interiors of dwellings.

7. The method of claim 1, wherein the map is a map of a geographic region.

8. The method of claim 1, wherein using the first database to populate a map with the set of avatars includes using the first database to populate a map of a real world location with the set of avatars.

9. A method for populating a map with a plurality of avatars through the use of a mobile technology platform, comprising:
   using the mobile technology platform to perform facial recognition scans on a plurality of real-world individuals in the environment external to the mobile technology platform, wherein each of the facial recognition scans uses at least one facial recognition algorithm to identify a set of facial features on a subject of the scan;
   recording the time and location at which each facial recognition scan was performed;
   associating a set of facial features identified on one of the plurality of real-world individuals with a set of time and location data, wherein the set of time and location data includes at least one time and location at which a facial recognition scan identifying the set of facial features on the one of the plurality of real-world individuals was performed;
   generating a plurality of avatars, wherein each of the plurality of avatars is generated from a set of facial features corresponding to one of the plurality of real-world individuals; and
   for each one of the plurality of avatars, using at least one element selected from the time and location data corresponding to the set of facial features used to generate the one of the plurality of avatars to determine at least one appearance characteristic on a map for the one of the plurality of avatars, wherein the at least one appearance characteristic is selected from the group consisting of (a) a location at which the one of the plurality of avatars appears on the map, and (b) a time at which the one of the plurality of avatars appears on the map.

10. The method of claim 9, further comprising:
    associating each one of the plurality of avatars with the set of facial features used to generate the one of the plurality of avatars.

11. The method of claim 10, further comprising:
    associating each one of the plurality of avatars with the set of time and location data corresponding to the set of facial features used to generate the one of the plurality of avatars.

12. The method of claim 11, further comprising:
creating a database of maps;
creating a database of avatars from the plurality of avatars;
creating a database of avatar placement from the set of time and location data associated with each avatar;
selecting a map from the database of maps;
selecting avatars from the database of avatars;
obtaining placement data from the database of avatar placement; and
determining the placement of the selected avatars on the selected map by applying a placement algorithm to the obtained placement data.

13. The method of claim 12, wherein the placement algorithm uses the obtained placement data in conjunction with a random deviation to determine the placement of the selected avatars on the selected map.

14. The method of claim 9, wherein the at least one appearance characteristic is selected from the group consisting of a location at which the one of the plurality of avatars appears on the map.

15. The method of claim 9, wherein the at least one appearance characteristic is selected from the group consisting of a time at which the one of the plurality of avatars appears on the map.

16. The method of claim 9, wherein using the mobile technology platform to perform facial recognition scans on a plurality of real-world individuals in the environment external to the mobile technology platform includes capturing images of the plurality of real-world individuals in the environment external to the mobile technology platform, and performing facial recognition scans on the captured images.

17. The method of claim 16, wherein the images of the plurality of real-world individuals are captured in the physical presence of a user of the mobile technology platform.

18. The method of claim 9, wherein the mobile technology platform is a smartphone.

19. The method of claim 9, wherein at least one of the facial recognition scan identifies a set of facial features on a first subject, and wherein the set of time and location data includes at least one time and location at which the at least one facial recognition scan was performed in the real world on the first subject.

20. A method for populating a map with a plurality of avatars through the use of a mobile technology platform, comprising:
using the mobile technology platform to perform facial recognition scans on a plurality of real-world individuals in the environment external to the mobile technology platform, wherein each of the facial recognition scans uses at least one facial recognition algorithm to identify a set of facial features on a subject of the scan;
recording the time and location at which each facial recognition scan was performed;
associating a set of facial features identified on one of the plurality of real-world individuals with a set of time and location data, wherein the set of time and location data includes at least one time and location at which a facial recognition scan identifying the set of facial features on the one of the plurality of real-world individuals was performed;
generating a plurality of avatars, wherein each of the plurality of avatars is generated from a set of facial features corresponding to one of the plurality of real-world individuals;
for each one of the plurality of avatars, using at least one element selected from the time and location data corresponding to the set of facial features used to generate the one of the plurality of avatars to determine at least one appearance characteristic on a map for the one of the plurality of avatars, wherein the at least one appearance characteristic is selected from the group consisting of (a) a location at which the one of the plurality of avatars appears on the map, and (b) a time at which the one of the plurality of avatars appears on the map;
associating each one of the plurality of avatars with the set of facial features used to generate the one of the plurality of avatars;
associating each one of the plurality of avatars with the set of time and location data corresponding to the set of facial features used to generate the one of the plurality of avatars;
creating a database of maps;
creating a database of avatars from the plurality of avatars;
creating a database of avatar placement from the set of time and location data associated with each avatar;
selecting a map from the database of maps;
selecting avatars from the database of avatars;
obtaining placement data from the database of avatar placement; and
determining the placement of the selected avatars on the selected map by applying a placement algorithm to the obtained placement data.

* * * * *